(12) United States Patent
Song

(10) Patent No.: US 6,678,254 B1
(45) Date of Patent: Jan. 13, 2004

(54) METHOD AND COMMUNICATION DEVICE FOR OPTIMIZING ECHO CANCELLATION

(75) Inventor: Wei-jei Song, Aliso Viejo, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/304,139

(22) Filed: May 3, 1999

(51) Int. Cl.⁷ .............................................. H04B 3/20
(52) U.S. Cl. ..................................... 370/290; 370/289
(58) Field of Search ............................... 370/286, 287, 370/288, 289, 290–292, 268, 269; 379/3, 406.1, 406.05; 381/163, 318, 83, 93, 95; 375/233, 240.05, 252, 358, 222, 229–232, 234, 235, 236, 346–351

(56) References Cited

U.S. PATENT DOCUMENTS

| | | | |
|---|---|---|---|
| 4,965,823 A | | 10/1990 | Nakagawa et al. |
| 5,016,271 A | | 5/1991 | Ford |
| 5,029,167 A | * | 7/1991 | Arnon et al. ............... 370/290 |
| 5,050,160 A | | 9/1991 | Fuda |
| 5,247,512 A | | 9/1993 | Sugaya et al. |
| 5,278,872 A | * | 1/1994 | Greenberg .................. 348/614 |
| 5,305,307 A | | 4/1994 | Chu |
| 5,313,498 A | | 5/1994 | Sano |
| 5,323,458 A | | 6/1994 | Park et al. |
| 5,323,459 A | * | 6/1994 | Hirano ....................... 370/290 |
| 5,343,522 A | | 8/1994 | Yatrou et al. |
| 5,400,394 A | | 3/1995 | Raman et al. |
| 5,530,724 A | | 6/1996 | Abrams et al. |
| 5,594,719 A | | 1/1997 | Oh et al. |
| 5,606,550 A | | 2/1997 | Jangi |
| 5,610,909 A | | 3/1997 | Shaw |
| 5,631,899 A | | 5/1997 | Duttweiler |
| 5,659,609 A | | 8/1997 | Koizumi et al. |
| 5,680,451 A | | 10/1997 | Betts et al. |
| 5,682,378 A | | 10/1997 | Betts et al. |
| 5,748,726 A | | 5/1998 | Unno |
| 5,796,819 A | | 8/1998 | Romesburg |
| 5,905,717 A | | 5/1999 | Hasegawa |
| 5,920,548 A | * | 7/1999 | El Malki .................... 370/291 |
| 5,987,098 A | | 11/1999 | Wintour |
| 6,064,873 A | | 5/2000 | Eriksson et al. |
| 6,160,886 A | * | 12/2000 | Romesburg et al. ... 379/406.05 |
| 6,185,300 B1 | * | 2/2001 | Romesburg ................. 370/290 |
| 6,201,866 B1 | * | 3/2001 | Ariyama et al. ....... 379/406.01 |
| 6,236,725 B1 | * | 5/2001 | Takada et al. ......... 379/406.01 |

OTHER PUBLICATIONS

☐Selective coefficient update of gradient–based adaptive algorithms Aboulnasr, T.; Mayyas, K, Speech, and Signal Processing, 1997. ICASSP–97., 1997 IEEE Conference on, vol.: 3 , 1997 Page(s): 1929–1932 vol. 3.*

Kuo, Sen Multiple–Microphone Acoustic Echo Cancellation System with the Partial Adaptive Process, Digital Signal Processing 3,(1993).*

* cited by examiner

Primary Examiner—Salvatore Cangialosi
(74) Attorney, Agent, or Firm—Blakely Sokoloff Taylor & Zafman LLP

(57) ABSTRACT

An echo canceller is described with improved performance. The echo canceller is capable of maintaining audio quality with less consumption of processor cycles by initially segmenting coefficients corresponding to successive audio samples of a delay line into a predetermined number of segments. The coefficients are used in computing an echo estimate. Upon segmenting the coefficients, certain segments are assigned to a first segment group, where the coefficients of that group are updated more frequently than coefficients assigned to one or more of the remaining groups. In one embodiment, this grouping is achieved by periodically computing a cumulative magnitude of the coefficients of each segment for all coefficients of the segments and subsequently placing a lesser number of segments with the highest cumulative coefficient magnitudes into the first segment group. Of course, in lieu of cumulative magnitude calculations, the energy of the coefficients may be computed. In any event, the remainder of the segments may be placed into a second segment group or multiple groups that are updated less frequently than the first segment group.

31 Claims, 8 Drawing Sheets ns. In particular, this invention relates to a device and
METHOD AND COMMUNICATION DEVICE FOR OPTIMIZING ECHO CANCELLATION

BACKGROUND

1. Field

The present invention relates to the field of communications. In particular, this invention relates to a device and method for enhancing the quality of audio transferred over a network without increasing processor cycle time and/or maintaining audio quality with reduced processor cycle time.

2. General Background

During a two-way telephone conference, a caller sometimes can hear his or her own voice as a delayed echo. This phenomenon is referred to as "talker echo". One cause for talker echo is the presence of signal reflections in a transmission path. Often, signal reflections occur at hybrid circuits. Generally speaking, a hybrid circuit is a transformer circuit that is designed for coupling together different types of transmission lines. It is commonplace for voice-based communication networks to be implemented with different types of transmission lines, and thus, necessities the need for echo cancelling techniques to mitigate or eliminate the echo.

Besides talker echo, acoustic echo is an inherent problem in wireless handsets. The reason is that typical handsets continuously maintain their speaker (or earphone) and microphone in an active state. This creates an acoustic coupling between the speaker (or earphone) and microphone. In addition, when applicable, acoustic echo may be caused by crosstalk in the handset cord. Thus, echo cancellation techniques are also used to mitigate the effects of acoustic coupling.

Typically, an echo canceller is used to reduce or eliminate any type of echo. For example, to reduce echo caused by signal reflections from the hybrid circuit, the echo canceller (i) simulates an estimated echo, and (ii) subtracts the estimate echo from outgoing voice data. The most common method for estimating the amount of echo is through the use of least mean square (LMS) coefficients to model impulse responses for signal reflections from the hybrid circuit. Of course, the same technique can be used to model echo path impulse responses between a receive line (for speaker) and a transmit line (for microphone).

In particular, the LMS coefficients are computed values that are used in connection with samples of audio signals to calculate an estimated echo and minimize residual echo. LMS coefficients are historical in nature; namely, newly computed coefficients are dependent on prior coefficients. Since echo cancellers must be able to handle signal delay and a few milliseconds of signal reflection, a predetermined number of LMS coefficients are stored in memory and correspond to samples of a fixed length delay line. These LMS coefficients are continuously updated every sample time.

One problem with the above-described echo cancellation technique is that a significant number of processing cycles are consumed in order to update the LMS coefficients every sample time. Currently, approximately five million instructions per second (MIPS) are needed to maintain coefficients computed for the most recent 128 audio samples along a single channel. Since the MIPS rate is proportional to the length of the delay line, this MIPS rate has greatly prevented the use of a longer delay line to enhance voice quality as well as the use of higher density (multi-channel) hardware.

Hence, it would be desirable to provide a device and method that reduces the MIPS rate for coefficient updates without quality degradation of the transmitted information.

SUMMARY

In brief, one embodiment of the present invention to a communication device and method for enhancing or maintaining the quality of information communicated over a network with the same or reduced processor cycle time. This is accomplished by separating coefficients into multiple segments, where the coefficients correspond to a memory location of a delay line allocated to contain one of a number of successive audio samples for use in computing echo estimates. After separating the coefficients, certain segments are assigned to a first segment group, where the coefficients of that group are updated more frequently than coefficients assigned to one or more of the remaining groups.

In one embodiment, the grouping is achieved by periodically monitoring all of the segments to determine the cumulative magnitude of the coefficients of each segment and subsequently placing certain segments with the highest cumulative coefficient magnitudes into the first segment group. The remainder of the segments may be placed into a second segment group or multiple groups that are updated less frequently than the first segment group. It is contemplated that the grouping may be based on cumulative energy values in lieu of cumulative magnitudes. In that situation, a greater significance is placed on widely varying coefficients.

This placement of coefficients into segments that are updated at different times provides a variety of benefits. It allows for a reduction in MIPS executed by a processor during echo cancellation while still supporting the same delay line size. Alternatively, it allows for support of longer delay lines without additional consumption of processor cycles, a greater number of channels or enhanced audio features.

BRIEF DESCRIPTION OF THE DRAWINGS

The features and advantages of the present invention will become apparent from the following detailed description of the present invention in which.

DETAILED DESCRIPTION

Figure 1:
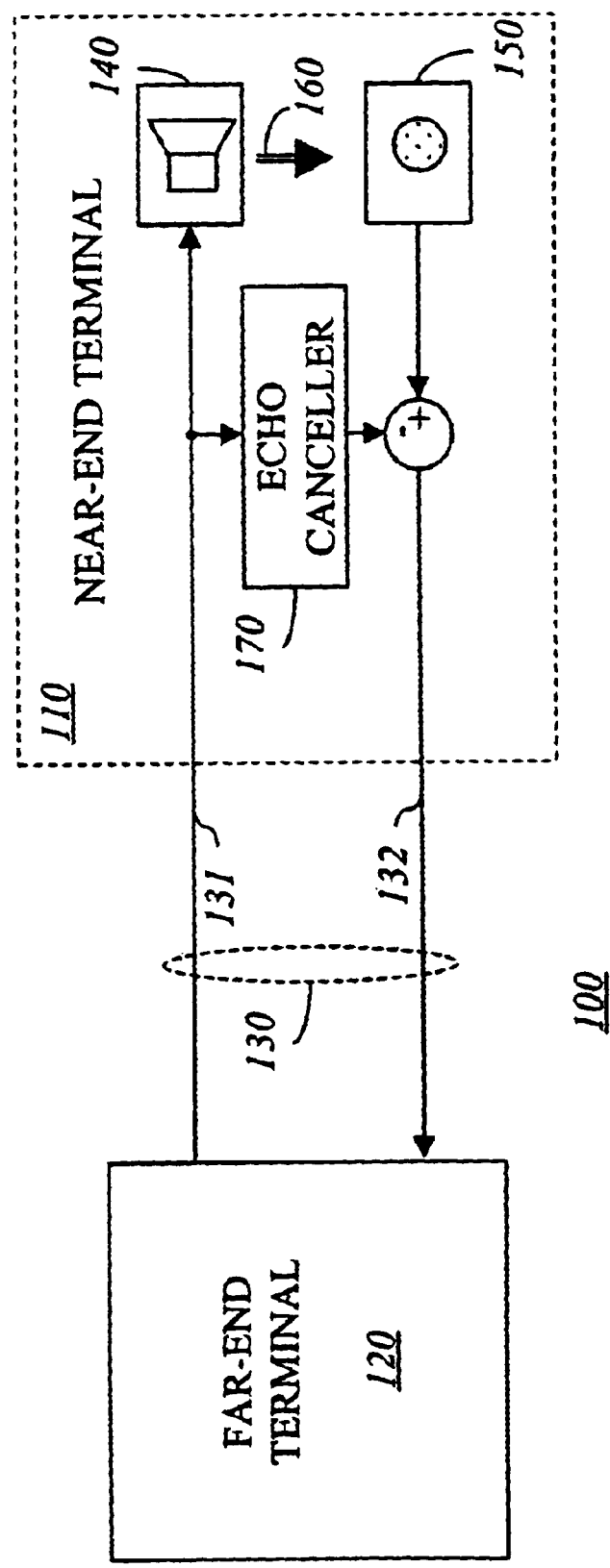
FIG. 1 is a block diagram of a first illustrative embodiment of a network employing one type of communication device having an echo canceller.

Herein, embodiments of the present invention relate to a communication device and method for enhancing the quality of audio (e.g., audio clarity, etc.) transferred over a network without increasing processor cycle time. This allows for a reduction in MIPS executed by a processor during echo cancellation to support echo cancellation with longer delay lines, a greater number of channels or enhanced audio features.

In brief, this can be accomplished by separating coefficients associated with a delay line into N segments ("N"≧2), where the delay line, in general, is a number of allocated memory locations to contain a predetermined number of successive audio samples for use in computing echo estimates. Upon separating the coefficients, certain segments (M; M<N) are assigned to a first segment group, where the coefficients of that group are updated more frequently than coefficients assigned to one or more of the remaining groups. This grouping is achieved by periodically monitoring all N segments to determine the cumulative magnitude of the coefficients of each segment and subsequently placing M segments with the highest cumulative coefficient magnitudes into the first segment group. The remainder of the segments (N–M) may be placed into a second segment group or multiple groups that are updated less frequently than the first segment group. It is contemplated that the grouping may be based on computed energy values in lieu of cumulative magnitudes. In that situation, a greater significance is placed on widely varying coefficients.

Herein, certain terminology is used to describe various features of the present invention. In general, a "network" comprises two or more communication devices coupled together through transmission lines. A "communication device" is broadly defined as hardware and/or software able to transmit and/or receive information with perhaps echo canceling functionality. Examples of a communication device include but are not limited or restricted to the following: (1) a networking device (e.g., a packet value switch) including an echo canceller that transfers information over a network, and/or (2) a terminal including an echo canceller that functions as an originator or targeted destination of the information (e.g., a packet voice terminal such as a computer or a set-top box supporting telephony characteristics, a digital telephone, a cellular phone, etc.). "Information" includes audio such as voice signals, music signals and/or any other audible sounds.

As further described herein, a "transmission line" includes any medium capable of transmitting information at some ascertainable bandwidth. Examples of a transmission line include a variety of mediums such as twisted pair lines, coaxial cable, optical fiber lines, wireless communication channels using satellite, microwave, or radio frequency, or even a logical link. An "echo canceller" is hardware and/or software that mitigates or eliminates echo signals present on a transmission path due to a variety of factors such as signal reflections. In one embodiment, the echo canceller includes software executable by a processor (e.g., a digital signal processor, a general microprocessor, a controller, a state machine and the like). However, it is contemplated that the echo canceller may include dedicated circuitry with no software execution capabilities.

Referring to FIG. 1, a block diagram of a first illustrative embodiment of a network 100 employing an echo canceller to mitigate acoustic echo is shown. Network 100 comprises a near-end terminal 110 coupled to a far-end terminal 120 over a bi-directional transmission path 130. In particular, near-end terminal 110 includes a speaker 140 and a microphone 150 coupled to a pair of transmission lines 131 and 132 forming a bi-directional transmission path 130. The acoustic coupling between speaker 140 and microphone 150 creates an echo path 160 over the air. Thus, an echo canceller 170 is employed within near-end terminal 110 and coupled to transmission lines 131 and 132 to analyze echo characteristics of outgoing information (e.g., audio signals) returned to far-end terminal 120 accompanied by incoming audio and/or comfort noise from near-end terminal 110. An embodiment illustrative of the general architecture of echo canceller 170 is shown in FIGS. 3 and 4.

Figure 2:
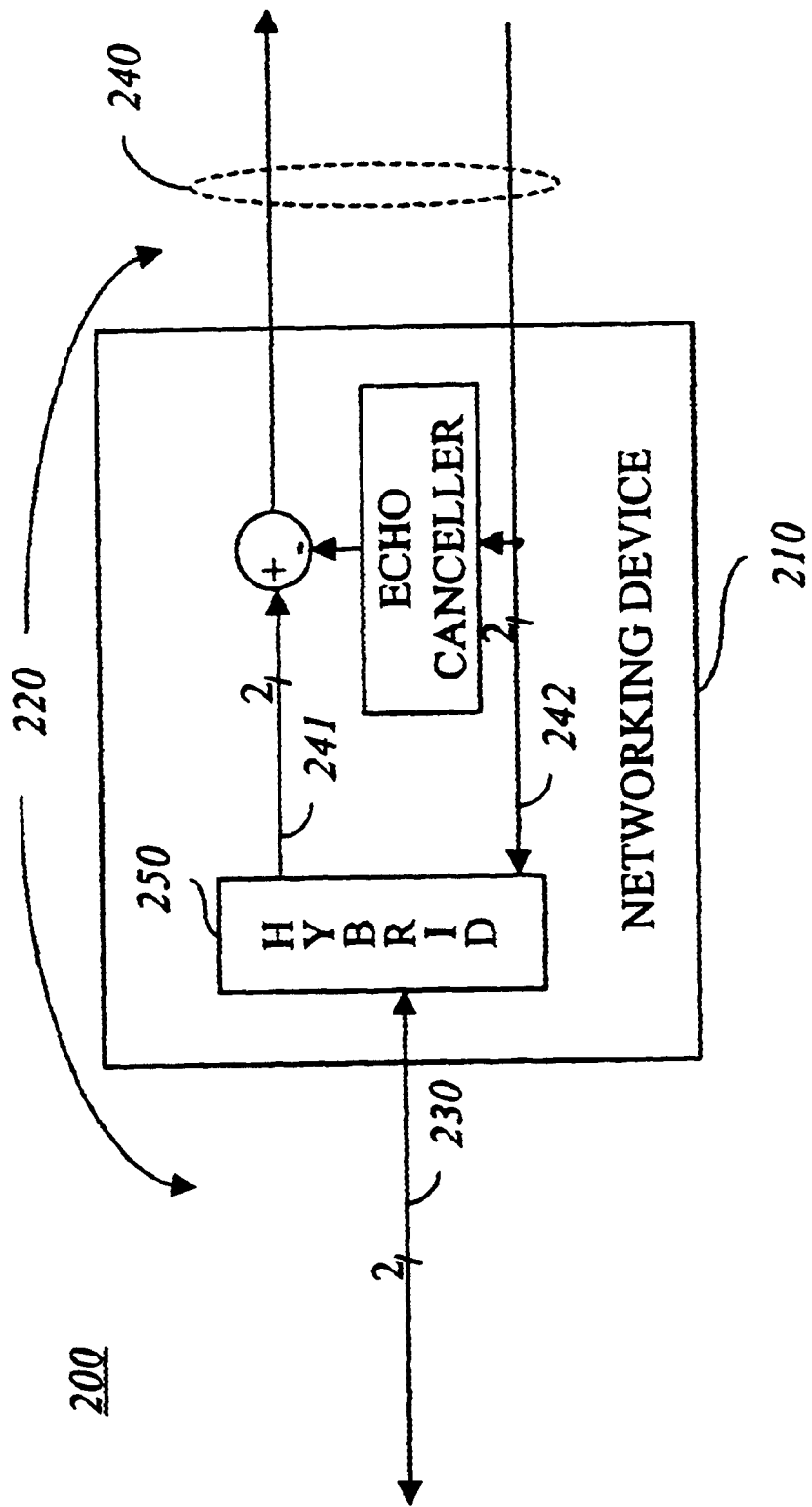
FIG. 2 is a block diagram of a second illustrative embodiment of a network employing another type of communication device having an echo canceller is shown.

Referring now to FIG. 2, a block diagram of a second illustrative embodiment of a network 200 employing a networking device 210 having echo canceller 170 is shown. Herein, networking device 210 provides transmission path 220 for incoming and outgoing audio signals. In this embodiment, transmission path 220 partially includes a two-wire "local" transmission line 230 (e.g., twisted pair) coupled to a long-distance (four-wire) "trunk" transmission line 240 (e.g., optical fiber lines, microwave or some other digital transport medium). As shown, trunk transmission line 240 includes a pair of separated two-wire transmit (TX) and receive (RX) lines 241 and 242.

As shown, echo canceller 170 mitigates echo returned from incoming audio signals over transmission line 242. The echo may be a result of signal reflections caused by a hybrid circuit 250, situated in networking device 210, that is designed to couple together transmission lines 230 and 240. Alternatively, the echo may be caused by unbalanced impedance(s) from switch(es) along transmission path 220, although reflections from hybrid circuit 250 usually provide a significant portion of the echo.

Figure 3:
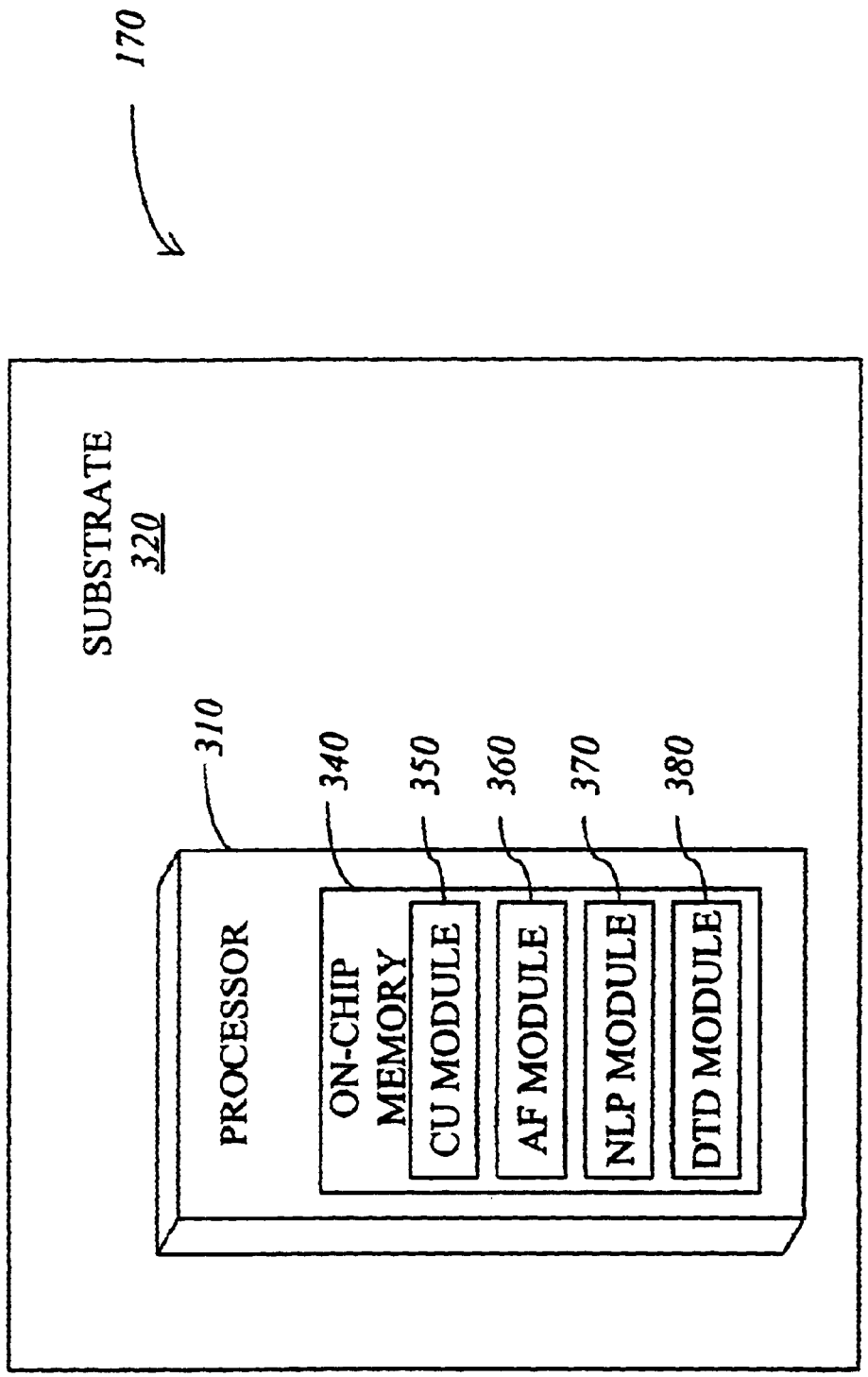
FIG. 3 is a block diagram of an embodiment of the echo canceller employed within the communication device of FIG. 1 or FIG. 2.
Figure 4:
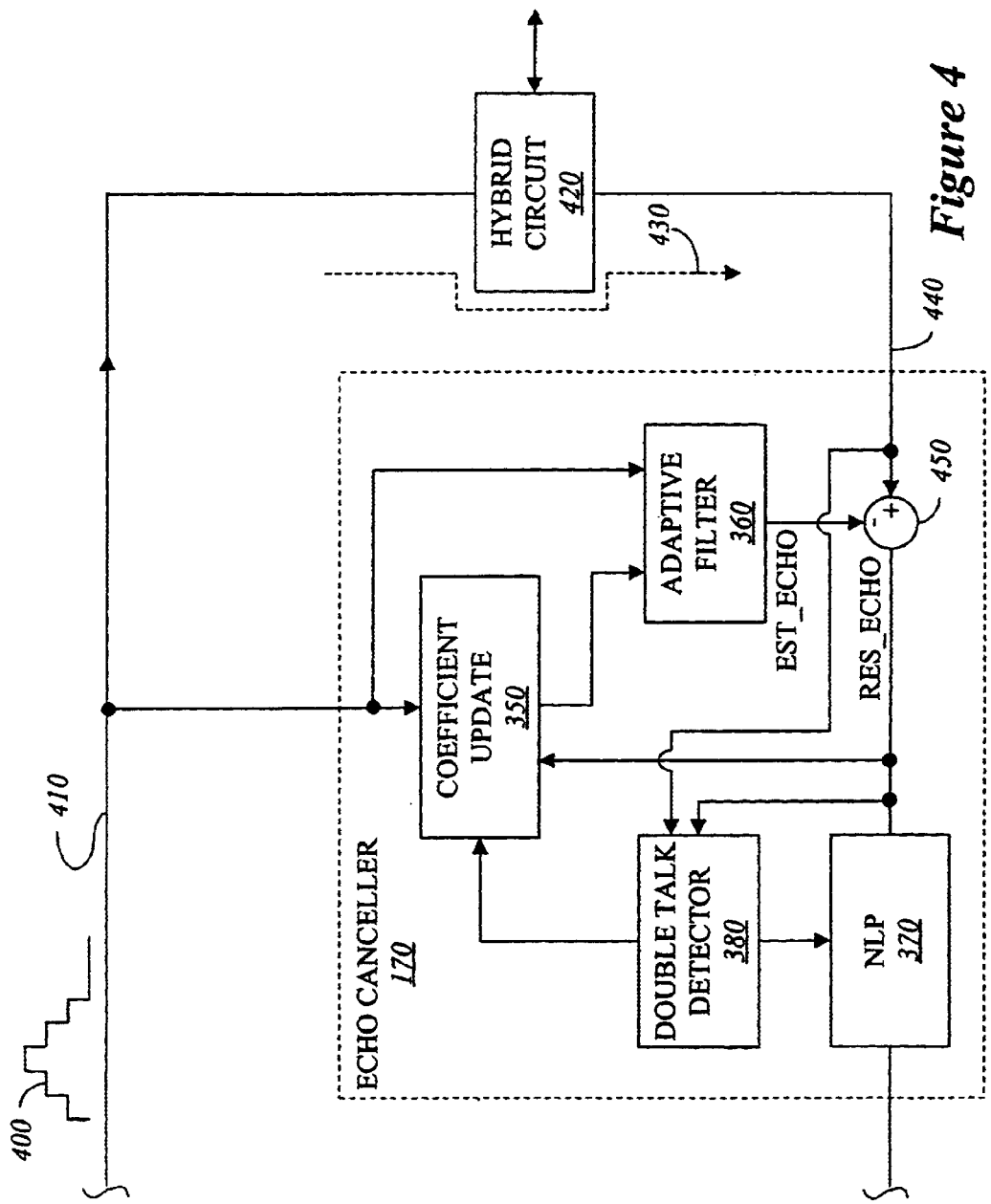
FIG. 4 is a block diagram of an embodiment featuring general echo cancellation operations performed by a processor of FIG. 3.

Referring now to FIG. 3, a block diagram of an embodiment of communication device 300 (e.g., a near-end terminal 10 of FIG. 1 or a networking device 210 of FIG. 2) employing echo canceller 170 is shown. In this embodiment, echo canceller 170 comprises a processor 310 coupled to a substrate 320 formed with any type of material or combination of materials upon which integrated circuit (IC) devices can be attached. Examples of substrate 320 include a daughter card, a network card, a motherboard and the like.

Processor 310 includes, but is not limited or restricted to a digital signal processor, a general purpose microprocessor, a micro-controller or any other logic having software processing capabilities. Processor 310 includes an on-chip memory 340 to store echo cancellation software, samples of audio signals and coefficients corresponding to the audio samples. "Coefficients" are computed values that are used in connection with samples of audio signals to calculate an estimated echo and minimize residual echo. Each coefficient may be computed as a normalized least mean square value as shown in equation (1):

$$(1) h_k(n) = h_k(n-1) + (\beta^* x(n)^* e(n))/|x|^2$$

where: "$\beta$" is a constant (step size),

"x(n)" is the current audio sample for sequence "k",

"e(n)" is the current residual echo, and

"x" is the energy associated with the average incoming audio signal $x_n$.

The software executable by processor 310 comprises a coefficient update module 350, an adaptive filter module 360, nonlinear processor (NLP) module 370, and a double talk detection (DTD) module 380. Of course, for relaxed timing constraints, some or all of these modules 350, 360, 370 and 380 may be stored in off-chip memory. The general operations of these modules 350, 360, 370 and 380 are described in FIG. 4.

Thus, processor 310 operates as an echo canceller. It is contemplated, however, that other embodiments for echo cancellers may be implemented in lieu of a software-based processor implementation. For example, echo canceller 170 may be implemented with programmable logic or even combinatorial logic to perform the operations associated with adaptive filtering, summing and nonlinear processing.

Referring now to FIG. 4, a block diagram of an embodiment featuring general echo cancellation operations performed by processor 310 of FIG. 3 is shown. Receive audio 400 is digitized before being transferred through a receive transmission path 410. It is contemplated that receive audio 400 may be computed through one or more well-known techniques such as pulse code modulation, time-division multiplexing, frequency-division multiplexing, or other current or later developed techniques. In this embodiment, a hybrid circuit 420 causes signal reflections to propagate over an echo path 430 so that echo is now present on a transmit transmission path 440. The attenuation of the echo (in decibels "dB") is referred to as the "echo return loss". The echo is provided to a summing circuit 450.

Concurrent to the above-described operations, receive audio 400 may undergo high-pass filtering to remove direct current (DC) components normally ranging at a frequency inaudible by the human ear. For this embodiment, coefficient update module 350 initially computes coefficients (labeled "h(n)" or "$h_n$") based on receive audio 400 and prior residual echo values (RES_ECHO) in order to more accurately estimate the echo path. These coefficients are successively stored in allocated memory locations corresponding to locations for samples over a delay line acting in accordance with a first-in, first-out storage protocol. In this embodiment, the coefficients are computed using least mean square calculations. Of course, it is contemplated that the coefficients may be calculated entirely or partially based on other well-recognized approaches such as recursive least square, affine transforms, Infinite Impulse Response (IIR) filter and pre-whitening.

In order to optimize processor efficiency, the coefficients are segmented into N segments. For updating purposes, coefficient update module 350 performs a segment updating scheme that periodically updates different groups of segments at different rates. The grouping of segments is based on cumulative magnitudes of the coefficients associated with the segments. These "cumulative coefficient magnitudes" indicate the importance of each segment (e.g., whether a delay in updating adversely effects convergence). Coefficient update module 350 also performs a segment monitoring scheme to recalculate the cumulative coefficient magnitudes of the segments. The periodicity of the recalculation is programmable. It is contemplated that the grouping may be based on computed energy values in lieu of cumulative coefficient magnitudes if desired.

Adaptive filter module 360 performs arithmetic operations on both the coefficients provided by coefficient update module 350 and the sampled receive audio to produce an estimated echo (EST_ECHO). EST_ECHO is made negative and loaded into summing circuit 450. Thus, EST_ECHO is subtracted from the echo. The level of the remaining echo signal is considered to be RES_ECHO. RES_ECHO is used by coefficient update module 350 to update the coefficients as set forth above in equation (1).

NLP module 370 is software that, upon execution, suppresses (or removes) the residual echo by clipping an output signal at amplitudes below a preset, constant or adaptive clipping amplitude threshold. Alternatively, NLP module may be designed so that the clipping amplitude threshold is dynamically adjusted as described in a co-pending U.S. Patent Application entitled "Adaptive Nonlinear Processor For Echo Cancellation" (App. No. 09/190,377).

A "double talk" condition occurs when audio is simultaneously transmitted between the far-end terminal and the near-end terminal. For example, two callers are talking at the same time. Upon detection of a double talk condition, DTD module 380 disables NLP module 370 and coefficient update module 350 to avoid any coefficient updates for that cycle and many cycles that follow for "hangover".

Figure 5:
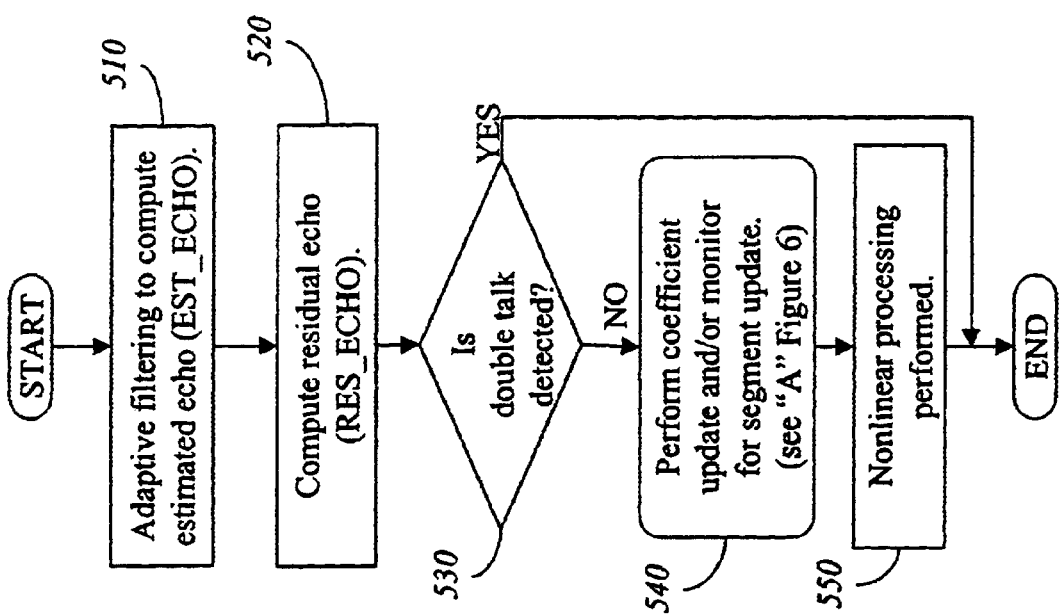
FIGS. 5 and 6 are flowcharts of the echo cancellation operations including a segment monitoring and update scheme to optimize the consumption of processing cycles by the processor of FIG. 3.
Figure 6:
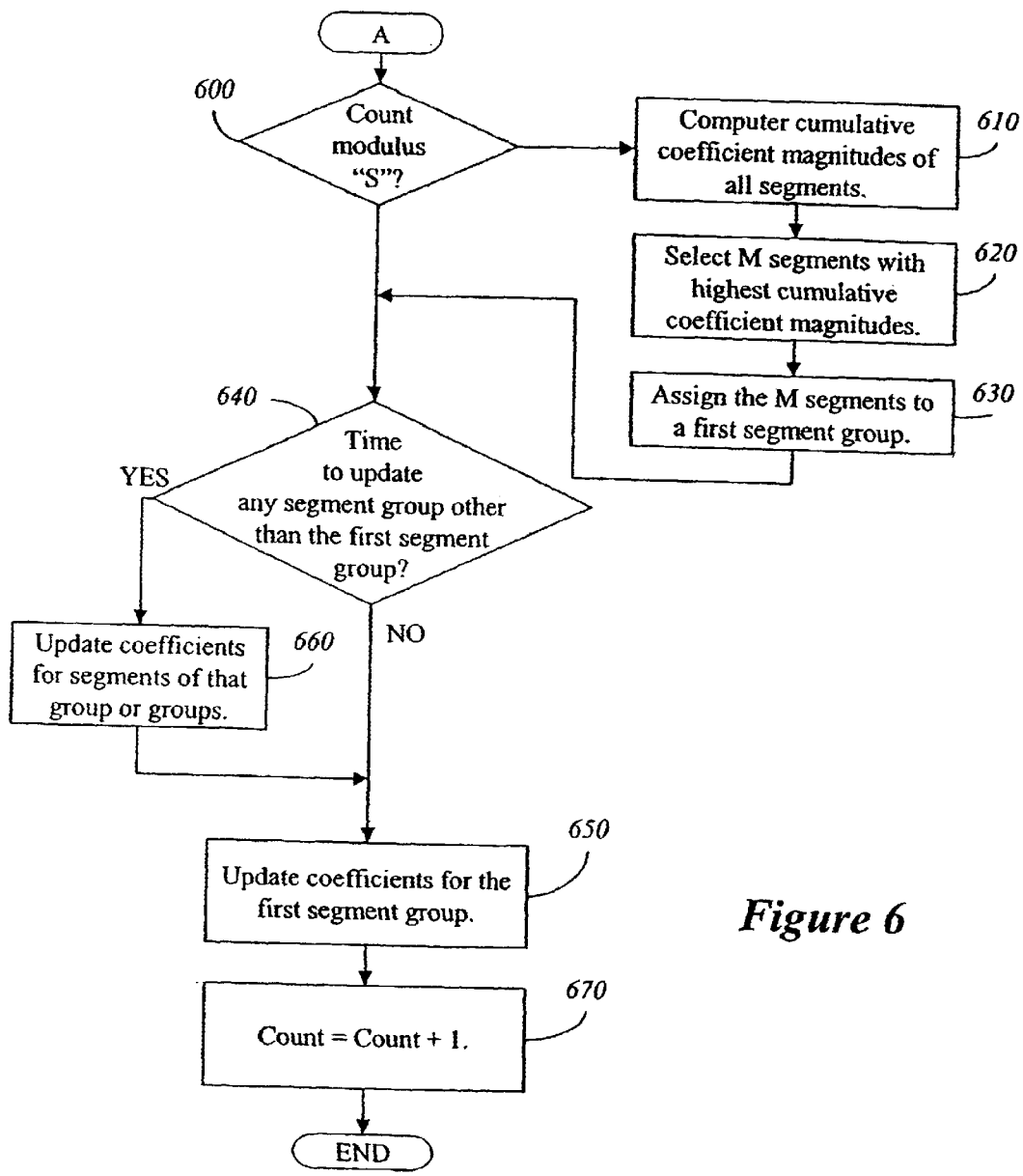

Referring to FIGS. 5 and 6, flowcharts of an embodiment featuring specific echo cancellation operations are shown, including the segment monitoring and updating schemes, which optimizes processing cycle time by processor 310 of FIG. 3. In this embodiment, the delay line contains receive samples associated with the most recent Q sample times (Q=32).

As shown, incoming receive audio undergoes adaptive filtering (block 510). During adaptive filtering, in block 510, sampled audio x(0) through x(n−Q) and coefficients associated therewith (h(k); "k" ranging from 0 to Q−1). The sampled audio and coefficients are used to compute an estimated echo (EST_ECHO) as shown in equation (2). For this equation, a 128 (Q) sample delay line is supported.

$$\sum_{k=0}^{k=127} x(n-k) \cdot h(k) \qquad (2)$$

EST_ECHO is subtracted from the echo to compute the residual echo (RES_ECHO), which is used to update the coefficients to further minimize the residual echo (block 520).

Before initiation of the segment monitoring and updating schemes, a determination is made whether a double talk condition exists (block 530). If so, both non-linear processing and the segment monitoring and update schemes are disabled for as long as the double talk condition persists including hangover. In the absence of double talk, a segment monitoring and updating schemes are performed (block 540) as set forth in more detail in FIG. 6.

It is presumed that the coefficients have already been partitioned into N segments (N<Q). These segments are preferably equal in length, but it is contemplated that segments of varying size may be used as an alternative. As shown in FIG. 6, upon execution, the coefficient update module activates the segment monitoring scheme once every S sample times (S>1) to recalculate the cumulative coefficient magnitudes for each segment (block 600). If the count is modulus S (or reaches S after the count resetting every monitoring condition), the coefficient update module calculates the cumulative coefficient magnitudes of all segments (block 610). From these calculations, M segments (M<N) with the highest cumulative coefficient magnitude are assigned to a first segment group (blocks 620 and 630). The remaining segments (N−M) may be placed into a second segment group or multiple groups where the coefficients of that group(s) are updated less frequently than coefficients associated with the first segment group (block 640).

If the count is not modulus S, either a partial or full coefficient update is performed. In particular, a partial update occurs if no other segment groups besides the first segment group are scheduled to be updated. In this case, only the coefficients associated with segments of the first segment group are updated (block 650). A full update occurs if any segment groups are scheduled to be updated besides the first segment group (block 660). For example, when divided into only first and second segment groups, all coefficients associated with the segments would be updated. Thereafter, the count is incremented (block 670) and the schemes concluded until the next sample time.

Referring back to FIG. 5, after the segment monitoring and updating schemes have been completed for the current sample time, the RES_ECHO undergoes nonlinear processing to mitigate or perhaps remove any echo on a transmission signal (block 560). This may be accomplished by clipping the transmission signal at amplitudes below a clipping amplitude threshold. The threshold may be preset or dynamically adjustable.

Figure 7:
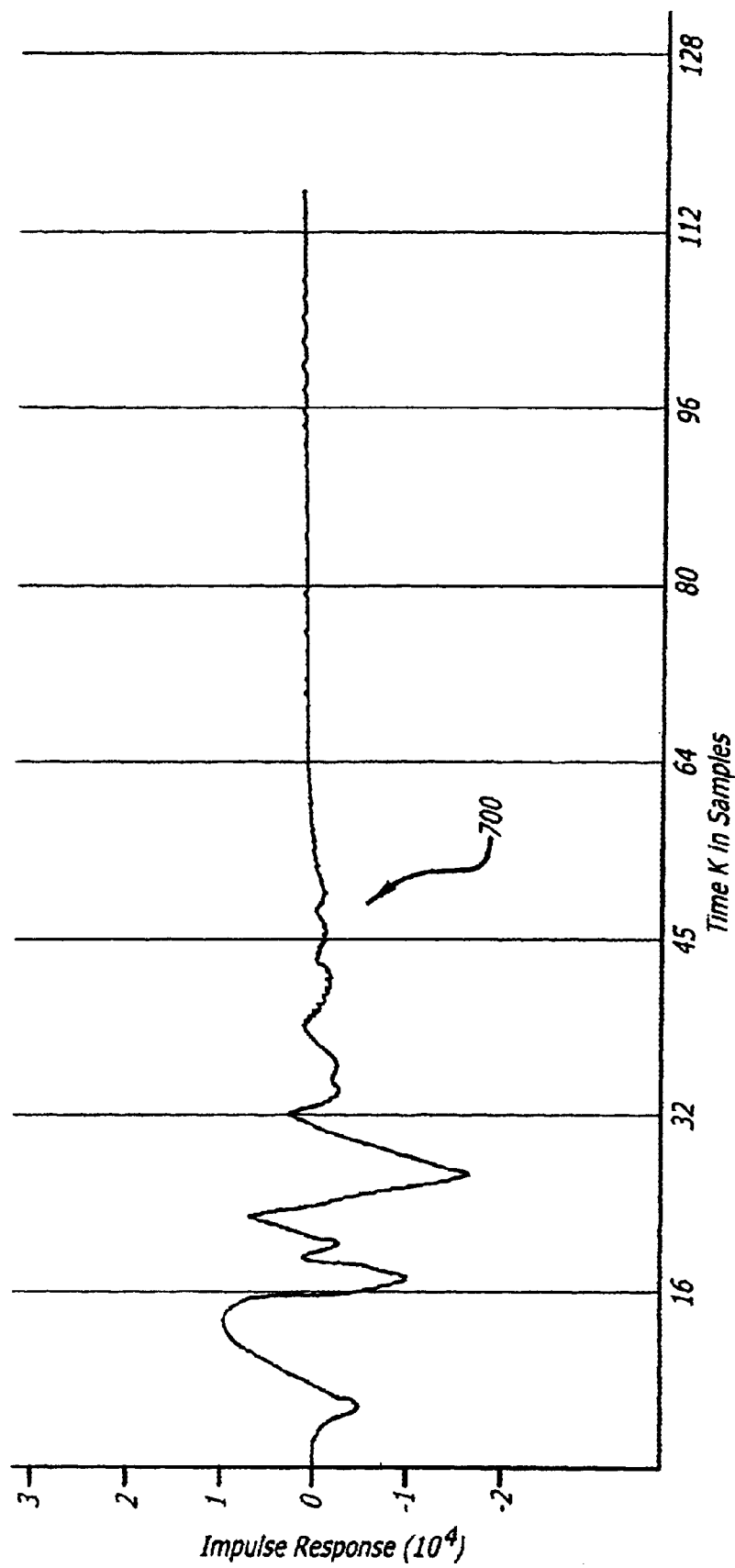
FIG. 7 is an exemplary example of an echo path impulse response.

Referring now to FIGS. 7, an exemplary example of an impulse response 700 associated with an echo path return is shown. Impulse response 700 represents the finite impulse response over a period of 128 sample times for example. Using a full sample rate of eight kilohertz (8 KHz), 16 milliseconds (ms) of finite impulse response are presented. Concurrently, the echo canceller is computing coefficients for adjustment of the adaptive filter to mitigate or eliminate the echo. These coefficients are stored in on-chip memory having at least 128 (Q=128) storage entries as shown in FIG. 8.

Figure 8:
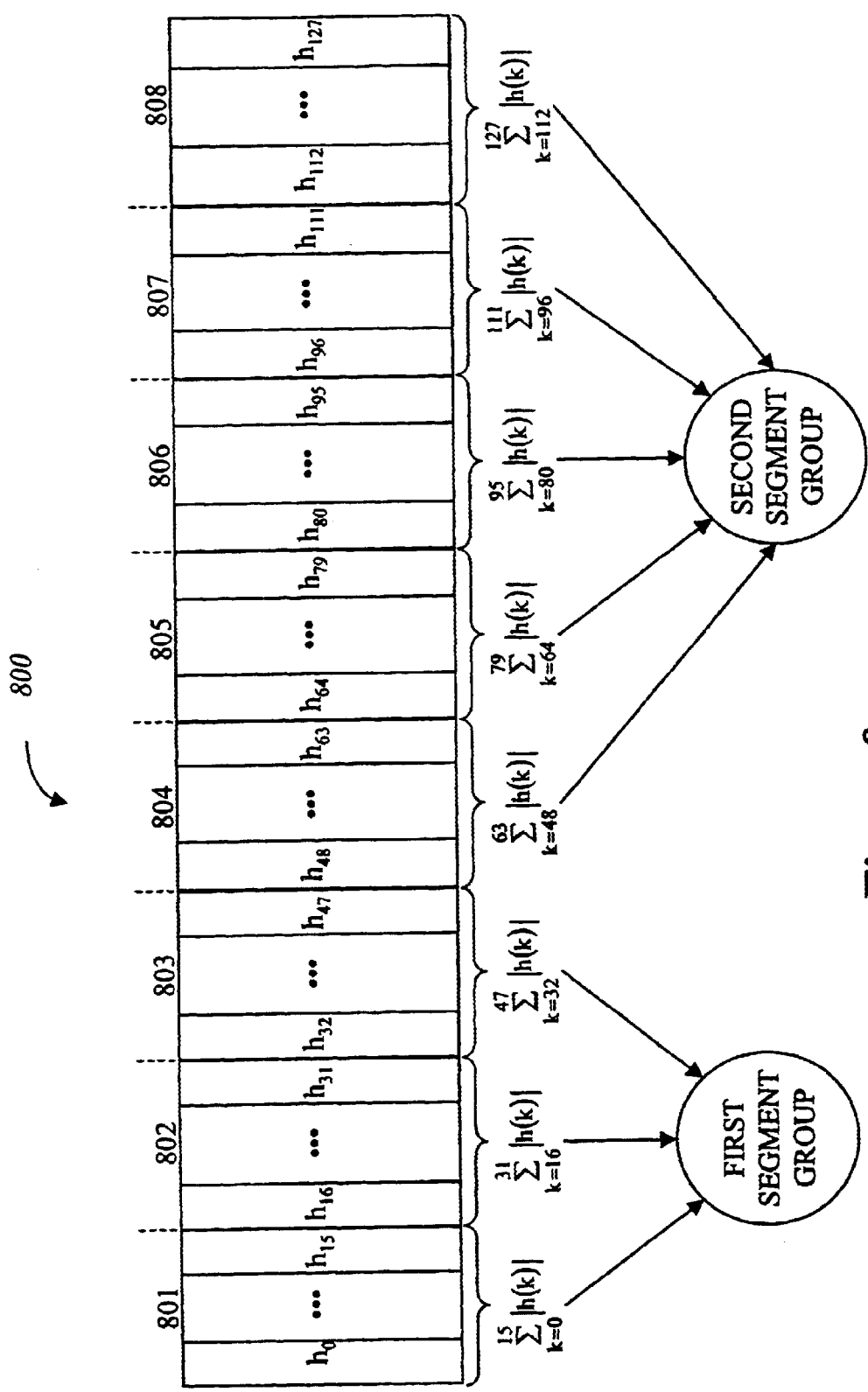
FIG. 8 is a block diagram of a segmented grouping of coefficients from which the frequency of coefficient updates may be calculated.

As shown in FIG. 8, allocated memory 800 for the coefficients is divided into eight (N=8) equal-length memory segments 801–808. For example, segment 801 stores the most recently calculated coefficients h(127) to h(112). The segment monitoring scheme is activated every nine (S=9) sample times to recalculate the cumulative magnitudes of the coefficient signals ($\Sigma h(n)$) for each segment. These eight cumulative coefficient magnitudes are compared to each other and the segments having the three (M=3) highest cumulative coefficient magnitudes are assigned to a first segment group. Based on the impulse response of FIG. 7, it is evident that three segments 801, 802 and 803 are assigned to the first segment group. Coefficients for his group are updated every sample time for the 9sample time period. The remaining segments 804, 805, 806, 807 and 808 are assigned to a second segment group. Coefficients for this group are updated only two out of every 9 sample times (e.g., at the fourth and eighth samples). This provides an estimated savings of 48% of processor cycles since the memory locations associated with lesser variation of the impulse response do not need as frequent updates as the more widely varying magnitude locations.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the invention can apply to acoustic echo cancellation, where no hybrid circuit is provided and the local loop line is replaced with air.

What is claimed is:

1. A method for echo cancellation comprising:

separating coefficients for adjustment of an adaptive filter into a plurality of segments;

periodically computing a cumulative magnitude for coefficients associated with each segment; and updating coefficients associated with at least one segment more frequently than coefficients associated with a remainder of the plurality of segments, the coefficients associated with the at least one segment having a greater cumulative coefficient magnitude than the coefficients associated with the remainder of the plurality of segments.

2. The method of claim 1, wherein each of the segments are of equal length.

3. The method of claim 1, wherein prior to separating the coefficients, the method comprising:

determining that no double talk condition exists.

4. The method of claim 1, wherein the computing of the cumulative coefficient magnitudes occurs at a first periodicity being once every predetermined number of sample times.

5. The method of claim 4, wherein the updating of the coefficients associated with the at least one segment occurs every sample time being more frequent than the first periodicity.

6. The method of claim 5, wherein the updating of the coefficients associated with the remainder of the plurality of segments occurs at a second periodicity being less often than once every sample time.

7. The method of claim 6, wherein the second periodicity is more frequent than the first periodicity for computing the cumulative coefficient magnitudes.

8. The method of claim 6, wherein the second periodicity is at least three times longer than the first periodicity.

9. A method comprising:

separating a plurality of coefficients into a plurality of segments, the plurality of coefficients being used to calculate an estimated echo for echo cancellation;

computing a cumulative measured value for coefficients associated with each segment;

assigning at least one segment of the plurality of segments to a first segment group, wherein coefficients associated with the at least one segment having a higher cumulative measured value than coefficients associated with any segment of a remainder of the plurality of segments; and updating the coefficients associated with the at least one segment more frequently than the coefficients associated with the remainder of the plurality of segments.

10. The method of claim 9, wherein the cumulative measured value is a cumulative magnitude for the coefficients associated with each segment.

11. The method of claim 9, wherein the cumulative measured value is a cumulative energy for the coefficients associated with each segment.

12. The method of claim 9, wherein prior to separating the coefficients, the method comprising:

determining that no double talk condition exists.

13. The method of claim 9, wherein the computing of the cumulative measured value for the coefficients associated with each segment of the plurality of segments occurs once every predetermined number of sample times.

14. The method of claim 13, wherein the predetermined number of sample times is less than or equal to nine sample times.

15. The method of claim 9, wherein the updating of the coefficients associated with the at least one segment occurs more frequently than the computation of the cumulative measured value.

16. The method of claim 15, wherein the updating of the coefficients associated with the at least one segment occurs every sample time.

17. The method of claim 15, wherein the updating of the coefficients associated with the remainder of the plurality of segments occurs with a periodicity more often than the computation of the cumulative measured value.

18. A communication device comprising:

a substrate;

a processor placed on the substrate; and a memory coupled to the processor, the memory to contain (i) coefficients and corresponding sampled audio to produce an estimate echo for echo cancellation, and (ii) a coefficient update module which, when executed by the processor, separates the coefficients into a plurality of segments, periodically computes a cumulative magnitude for coefficients associated with each of the plurality of segments, and updates coefficients associated with at least one segment more frequently than coefficients associated with a remainder of the plurality of segments.

19. The communication device of claim 18, wherein the coefficients in memory associated with the at least one segment are measured to have a greater cumulative magnitude than the coefficients associated with the remainder of the plurality of segments.

20. The communication device of claim 18, wherein the memory further contains a nonlinear processor module that, when executed by the processor, controls the processor to adjust the coefficients based on a measured residue echo being a difference between an actual echo and the estimated echo.

21. The communication device of claim 18, wherein the memory includes on-chip memory associated with the processor.

22. The communication device of claim 18, wherein the memory is physically separate from the processor.

23. A machine readable medium having embodied thereon a program for processing by a machine, the program comprising:

an adaptive filter module for computing an estimated echo to be subtracted from an actual echo, the estimated echo being based on a plurality of incoming audio samples and a corresponding plurality of coefficients; and a coefficient update module for separating the plurality of coefficients into at least a first segment and a second segment and for updating coefficients associated with the first segment more frequently than coefficients associated with the second segment.

24. The machine readable medium for claim 23, wherein the first segment and the second segment are of equal length.

25. The machine readable medium for claim 23, wherein the coefficients associated with the first segment having a higher cumulative magnitude than the coefficients associated with the second segment.

26. The machine readable medium for claim 23, wherein the coefficients associated with the first segment having a higher energy value than the coefficients associated with the second segment.

27. The machine readable medium for claim 23, wherein the machine includes a processor operating as an echo canceller.

28. The machine readable medium of claim 23, wherein the program further comprising:

a nonlinear processing module for clipping a residue echo being a difference between the actual echo and the estimated echo.

29. The machine readable medium of claim 28, wherein the program further comprising:

a double talk detection module for disabling the coefficient update module and the nonlinear processing module upon detection of a double talk condition.

30. An echo canceller comprising:

a coefficient update to compute a plurality of coefficients associated with a plurality of incoming digital signals and to vary a frequency in updating certain groupings of the plurality of coefficients;

an adaptive filter to produce an average amplitude level of an estimated echo associated with the plurality of incoming digital signals and the plurality of coefficients; and a summing circuit coupled to the adaptive filter, the summing circuit to compute a residue echo being a difference between an average amplitude level of an actual echo associated with outgoing digital signals and the average amplitude level of the estimated echo.

31. The echo canceller of claim 30 further comprising:

a nonlinear processor coupled to the summing circuit, the nonlinear processor to clip the outgoing digital signals based a clipping amplitude threshold.

* * * * *